March 24, 1942.    R. C. BENNER ET AL    2,277,507
HOLLOW TILE
Filed Dec. 16, 1938    2 Sheets-Sheet 1
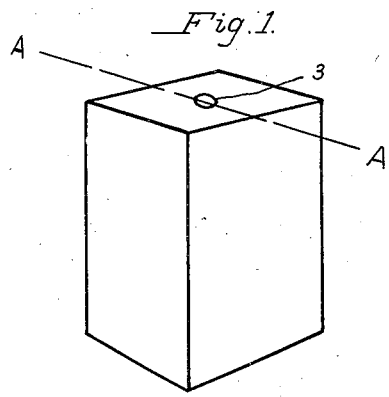
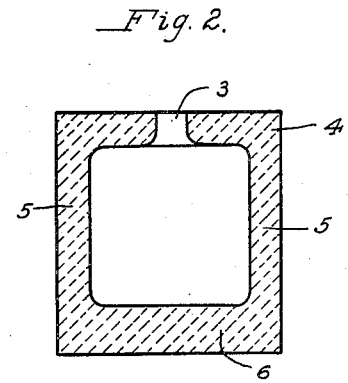
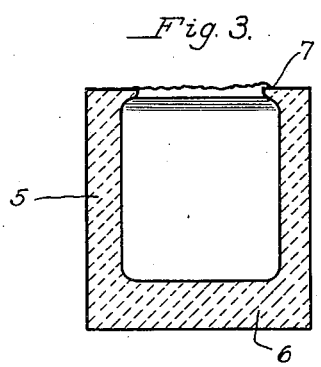
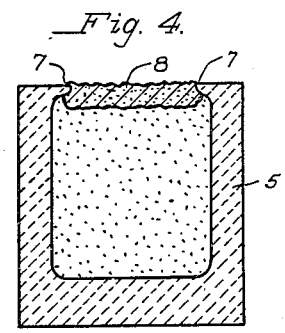
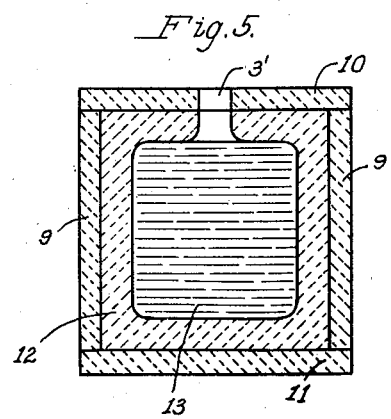
INVENTORS
RAYMOND C. BENNER
JOHN CHARLES McMULLEN
BY
R C Benner
ATTORNEY.

March 24, 1942.    R. C. BENNER ET AL    2,277,507
HOLLOW TILE
Filed Dec. 16, 1938    2 Sheets-Sheet 2

INVENTORS
RAYMOND C. BENNER
JOHN CHARLES McMULLEN
BY
RCBenner
ATTORNEY.

Patented Mar. 24, 1942

2,277,507

UNITED STATES PATENT OFFICE 2,277,507

HOLLOW TILE

Raymond C. Benner and John Charles McMullen, Niagara Falls, N. Y., assignors to The Carborundum Company, Niagara Falls, N. Y., a corporation of Delaware Application December 16, 1938, Serial No. 246,096

4 Claims. (Cl. 72—41)

This invention relates to the production of refractory material and more particularly to the production of dense homogeneous refractory castings of crystalline oxidic material, such refractory articles being intended particularly for use in the construction of walls and roofs of furnaces and tanks subject to the action of slags, glasses, etc.

This application is a continuation-in-part of our copending U. S. patent applications, Serial Numbers 56,705 and 56,706, filed on December 30, 1935.

Monolithic blocks of refractory oxidic materials formed by casting are valuable for the above purposes because of their resistance to the corrosive action of slag, glass, etc. However, with certain of the materials used in the production of monolithic refractory articles it is difficult to obtain an article which is dense and non-porous throughout.

Castings made of certain crystalline refractory oxidic materials such as $Al_2O_3$, $MgO$, $Cr_2O_3$, mullite and the like are frequently characterized by large voids or blow holes in their central portion so that the effective life of these castings is relatively small compared to the bulk of the block. The outer inch or more of the block is of a dense, non-porous structure which is well adapted to resist corrosion, but after this thickness has been eaten away the remainder of the block is rapidly penetrated and the block thus must be replaced long before all the refractory has been worn away. The reduced life of the refractory blocks resulting from this condition results in the waste of a large proportion of the refractory material in the block and makes the use of such blocks in those cases relatively expensive.

It is a purpose of our invention to remedy the objectionable features attending the use of cast refractory blocks as described above by producing a block in which the porous and non-useful central portion of the block is made with a definite cavity of controlled size and location, thereby reducing the weight of the block as much as one half, and wherein the wall of the block exposed to the action of slag, glass, etc., is preferably substantially thicker than the remaining walls of the block. Our invention further contemplates a method of making such blocks wherein the loss of a large amount of material as a header during fabrication is avoided and whereby a light relatively thin-walled casting is produced which has an effective thickness approximating that of the relatively more expensive solid castings.

Our invention provides a remedy for these defects by producing a hollow block which is open to the atmosphere at one face and which may have the walls opposite the opening substantially thicker than the remaining walls whereby the thick wall may be used as the face of the block in the walls of the tank or furnace to provide an effective thickness just as great as a solid casting which is somewhat porous in the center.

Our invention includes the production of cast refractory pieces by molding molten refractory oxidic material into an article comprising a solidified outer shell and a molten center portion, causing differential deposition of solid material on the inner wall of the shell from the molten material adjacent the face which is to be exposed in service so that the portion of the shell next the exposed face reaches a thickness greater than that of the adjacent portions, and removing excess molten material from a part of the shell before or after the said differential deposition of material. Referring for example, to the production of a block of crystalline refractory oxidic material, the molten refractory material may be cast into the shape of a block in a suitable mold which has a polyhedric mold cavity corresponding to the shape desired in the finished block, and an opening into the mold cavity through which the molten material may be poured into the mold. After pouring, the block is permitted to set until a shell, corresponding to the inner surface of the mold cavity, is formed by solidification of molten material in contact with the walls of the mold cavity. This shell will for a time remain filled with molten material. After the shell has built up to the desired thickness, some or all of the remaining molten material is poured out. To facilitate removal of the excess molten material any material which solidifies at the opening of the mold, or casting hole, may be removed by repeated blows with a suitable implement. While solidification of the shell is in progress, the block formed may be removed wholly or partially from the mold depending upon the nature of the material being cast, the material of the mold, and the shape desired in the finished hollow block. During this period molten material will continue to solidify on the walls of the shell depending upon the rate at which heat is abstracted from the shell walls. By abstracting heat more rapidly from one part of the shell than from others, this continued deposition of solid material may be utilized to build up differentially the wall which is to be exposed to the action of the corrosive slags, glasses, etc., in the furnace or tank structure. For convenience the casting operation may be carried out so that the wall to be especially thickened is the one opposite the casting hole. This differential deposition may be induced by several methods, which may be used independently or in combination.

The molten material may for example be cast into a mold constructed of material whereby the abstraction of heat from the resulting shell is substantially uniform throughout the outer surface thereof. After the desired minimum thickness of the shell formed is attained, a portion of the remaining molten material is poured out of the casting through the casting hole and the remainder of the molten material is deposited as solid matter on the wall of the casting which it is desired to have substantially thicker than the remaining walls by permitting the casting to rest with the said wall on the bottom, whereby the remaining molten material rests on the inner surface of the said wall, and abstracting heat from the said wall whereby the molten material is deposited as solid material to build up the wall to the desired thickness.

By another method the molten material may be poured into a mold so constructed that heat is withdrawn from the casting at differing rates at different portions of the casting, whereby molten material is solidified adjacent the inner wall of the mold cavity at different rates to build up a shell having the desired shape. For example, the mold may be arranged whereby heat is withdrawn at a higher rate from the portion of the mold opposite the casting hole so that the portion of the shell adjacent that portion of the mold is built up at a rate greater than in adjacent portions of the shell. Such differential cooling may be secured for instance by casting into a metal mold in which the mold wall is more massive or is specially cooled adjacent the face or faces which it is desired to make thicker. When the desired maximum and minimum thicknesses of the shell wall are attained the remainder of the molten material is poured from the shell through the casting hole.

A third example of methods of carrying out the invention comprises placing in the mold, and on the part of the mold which is to contact the part of the shell which it is desired to have of substantially greater thickness than the remainder of the shell, pieces or chunks of refractory material, preferably solidified fused material of substantially the same composition as the molten refractory material to be cast. When the molten material is cast into the mold thus provided the small pieces or chunks of solid material cause the formation of a thicker wall in the resulting shell adjacent their location because of the added bulk of solid material which they thus provide at that place, and also because they cause the chilling and solidification of material at a faster rate than that at other faces because of the increased cooling action which they provide. When the desired thicknesses in the wall of the shell are attained the molten material remaining in the shell is poured out through the casting hole as in the previously described methods.

In the production of hollow refractory blocks or cylindrical shaped pieces open on a flat side it is difficult to form an article by filling a mold with molten material and pouring out the excess molten material after a shell of the desired size has been formed to produce an article in which the edges are relatively smooth and of uniform or controlled thickness. As the molten material solidifies at its outer edges the resulting shrinkage lowers the level of molten material whereby an open space is produced in the shell at the top of the molten material. There is a tendency for the molten material to freeze over at various places between its highest and lowest level with the result that useless and troublesome shoulders or re-entrant portions are formed on the inner wall of the resulting article. It is also difficult to keep the portion of the shell exterior adjacent the casting hole smooth and uniform with the remainder of that face due to the deposition of solid material about the exterior of the hole when the molten material is poured from the shell.

By the use of a mold having a narrow thin ledge positioned about the inner vertical walls of the mold and dividing the mold into a main mold compartment and an upper header or reservoir compartment, but leaving an opening between the two compartments only slightly less in area than the top area of the molded article these troublesome shoulders can be eliminated without obstructing removal of the molten material from the mold after the desired degree of wall solidification. Also in removal of the still liquid central portion any slopping over of molten material does not adhere to the final shaped block but to the discarded header portion which is later easily removed.

Our invention also involves the production of a hollow refractory article which is a shell of dense homogeneous material having an opening therein of substantial area, the shell being slightly re-entrant at the edges of the opening. More specifically one particular modification of our invention contemplates the production of a hollow refractory block having an open face or an opening in a face which is slightly smaller than the corresponding inner face of the block.

The invention will be described with particular reference to the production of hollow blocks corresponding in size to refractory blocks commonly known as tank blocks whose particular use is in the construction of glass tanks, but it must be understood that these references are for purposes of illustration only, the invention including the production of blocks, bricks or other shapes of various sizes and for various uses to which their properties recommend them.

The invention also provides a new and useful mold for the production of hollow refractory articles, the said mold having a shape corresponding to the outer area of the articles to be formed and having extending about its inner surface a relatively narrow sharp ridge of refractory material.

The invention will now be illustrated by reference to the accompanying drawings, but it must be understood that we do not intend to limit the invention to the applications illustrated by the drawings but include within the scope of our invention other applications and modifications, which are readily apparent from the disclosure herein.

Referring to the drawings:

Figure 1 is a perspective view of a tank block made according to the modification of the present invention;

Figure 2 is a cross-section of a tank block, for example as along A—A of Figure 1;

Figure 3 is a cross-section of a hollow refractory article made according to another modification of the present invention and having one wall substantially thicker than the adjacent walls;

Figure 4 is a cross-section of a refractory block illustrating a third modification of the present invention; showing the presence of insulating material within the cast block;

Figure 5 is a cross-section of a mold containing a partially formed refractory article;

Figure 6:
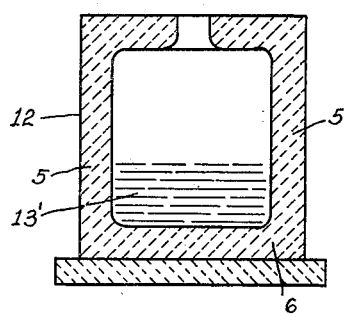
Figure 6 is a view similar to Figure 5 illustrating one method for making a block according to the present invention whereby part of the material is withdrawn leaving a residue to solidify.

Figures 1 to 4 inclusive illustrate refractory products to the production of which the present invention is particularly adapted though not necessarily limited. Figure 1 represents in perspective a tank block which is hollow, having an opening 3 into the interior through which excess molten material has been removed.

In Figures 2, 3 and 4 are illustrated various modifications of the tank blocks which can be made according to the present invention. In Figure 2, there is shown a tank block 4 comprising a plurality of walls 5 of substantially uniform thickness and a wall 6, opposite the opening 3, having a thickness substantially greater than the walls 5. Such a block is used in the building up of the walls of tanks and furnaces by laying the blocks so that walls 6 of the plurality of blocks are in alignment to form the inner surface of a wall of a tank or furnace.

Referring to Figure 3 the improved refractory article of the present invention consists of a shell 5 of dense homogeneous refractory material which has an opening in one face only slightly less in area than the area of the corresponding inner face of the shell, this difference in area being caused by the presence of the reentrant portion 7 which causes a ridge or ledge around the periphery of the opening.

It is desirable in producing these articles that one wall 6 of the shell, preferably the one opposite the opening, shall have a thickness substantially greater than the adjacent walls 5 whereby the block can be laid to present the thick face to the action of the corrosive slag and glasses, and thus present the maximum effective thickness to such action.

In preparation for use these hollow articles may be filled with insulating material as in Figure 4 or they may be used in their natural hollow state. The insulating material may be placed in the hollow block in a granular condition and retained in place by any suitable means, but preferably by means of a layer of plastic cement 8, which is pressed into place and dried or burned to form a solid contact underneath the reentrant portion 7 of the block 4. By another method the granular insulating material may be retained in place by sintering it after it is placed in the block whereby it forms a rigid mass which consists of particles sintered together and to the inner walls of the block.

Our new methods of making such articles are described with reference to the production of tank blocks, but it is quite evident that these methods are equally applicable to the production of other shapes and sizes of refractory articles.

In Figure 5 we illustrate a mold formed of refractory material which may be used in carrying out our invention consisting of side sections 9, top section 10, and base 11. The top section 10 is provided with an opening 3', through which the molten material may be poured into the mold. Molten refractory material may be poured into the mold from a suitable source, not shown, through opening 3'. When the molten material contacts with the relatively cool walls of the mold the portion adjacent the wall solidifies to form a continuous shell 12 of refractory material. Due to the rapid cooling of the material this shell is relatively dense and homogeneous and well adapted to resist the corrosive action of slag, glasses, etc.

It is usually desirable to cast the material whereby the casting hole lies opposite the face which it is desired to have substantially thicker than the adjoining walls of the refractory piece. Therefore, after the desired minimum thickness of the walls of the shell 12 is built up from the central reservoir 13 of the molten material, a portion of the molten material is poured out of the shell before or after the removal of a part or all of the walls of the mold. This leaves as shown in Figure 6, a portion 13' of molten material remaining in the shell 12 adjacent the bottom wall 6 of the shell, substantially smaller than the original reservoir 13 and in an amount calculated to produce the desired thickness of wall 6 as it completely solidifies in contact therewith. In order to quickly cool the reservoir 13' and cause the building up of wall 6 before the top of the material 13' becomes frozen over, it is desirable to abstract heat from the face of wall 6 at a substantially greater rate than from walls 5 whereby the reservoir 13' remains molten on the top while the wall 6 is built up by deposition of material from the reservoir to form a dense, homogeneous structure. This however, is not necessary as the occurrence of blow holes as the material solidifies may be prevented by breaking with a blow of a steel bar or other suitable implement any frozen over surface of the reservoir 13' which may form, thus causing this frozen crust (which has a higher density than the molten material) to sink into the underlying molten material and become bonded into the wall of the shell by the solidification of the remaining molten material.

Figure 7:
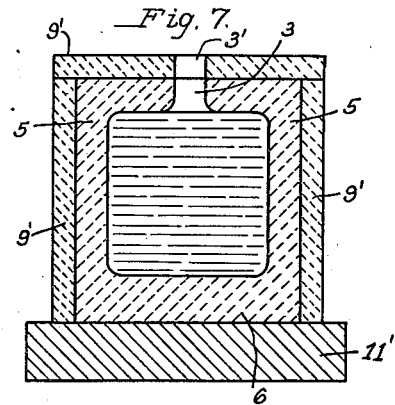
Figure 7 is a view similar to Figure 5 illustrating a second method for making blocks of the present invention whereby heat is preferentially abstracted from one face of the casting.

Another method of carrying out the present invention is illustrated in Figure 7 wherein the molten material is poured into a mold having a bottom plate 11' which is capable of abstracting heat from any material cast into the mold at a rate much greater than that of the side sections and top 9'. For example, the base plate 11' may be of a material having a high rate of conductivity, for example copper, whereas the wall 9' may be of refractory insulating material. Or the mold may consist entirely of metal, such as cast iron for the walls 9' and copper or aluminum for the walls 11'.

The unequal rate of removal of heat from the casting formed on pouring the molten material into the mold results from the first in the building up of wall 6 at a rate more rapid than walls 5 because of the more rapid abstraction of heat from wall 6. The relative rates of abstraction of heat from the various walls must be maintained to produce the desired minimum thickness of wall 5 simultaneously with the desired maximum thickness of wall 6. When the shell of the casting has assumed the desired shape due to the differential cooling, the remaining molten material is removed from the interior thereof by pouring it through opening 3', and the casting is subjected to further treatment, such as annealing, to perfect it.

Other methods of obtaining walls of differing thickness may be used, such as the use of a base plate carrying a coil containing a circulating cooling liquid such as water, or by the addition of chunks of for example ½"–¾" in diameter and preferably preheated to 600° C. to the bottom of the mold previous to casting.

It is thus seen that the method of the present invention in its various modifications comprises the formation of molten refractory material to an article comprising a solidified outer shell and a molten inner portion causing differential deposition of solid material on the inner wall of the shell from molten material contained therein whereby a portion of the shell acquires a thickness substantially greater than that of adjacent portions and removing excess molten material from the refractory shell.

Our invention further involves the formation of a shell which has a re-entrant portion extending about the periphery, preferably adjacent the casting hole, the said re-entrant portion being substantially thinner than adjacent sections of the wall of the shell. The shell is then divided along the re-entrant portion to produce two parts, one including the casting hole and the internal objectionable protuberances described above which occur adjacent the casting hole and a second part consisting of a hollow refractory body open on one face and having well defined substantially uniform walls and corners, but being slightly re-entrant at the opening.

Figure 8:
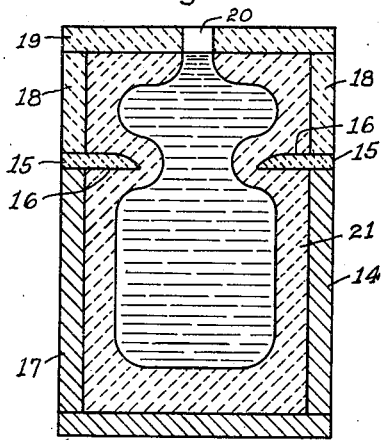
Figure 8 is a cross-section of a mold and hollow block in process of formation illustrating a method of the present invention.

Illustrating this method by reference to the production of a block, we have in Figure 8 illustrated a mold for carrying out this method and the formation of a shell having a re-entrant portion as described above. The mold 14 comprises two sections, a lower section 17 and an upper section 18, the upper section being in the nature of a header. The two sections of the mold may be made of any desired material depending upon the nature of the material being cast and the size and shape of the article to be cast. The two sections may be made of the same material, for example, cast iron or they may be made of different material, for example, section 17 may be made of cast iron and section 18 may be made of a refractory having a low heat conductivity. This latter construction is desirable for some purposes because it can be used to retard excessive deposition of solid material in the upper section of the mold where it is unnecessary and may be objectionable. Note however that it is desirable in general that the cross section of the upper portion should be of approximately the same dimensions as the cross section of the lower portion.

The mold may be left uncovered or it may be provided, particularly during the time the walls are forming, with a top portion 19 preferably of refractory material and provided with a casting hole 20 through which the molten material may be introduced into the mold. Inasmuch as the top portion of the shell is to be discarded however, this top 19 of the mold is not necessary but it assists in retarding the deposition of solid material at the top of the mold which might render the removal of the molten material from the shell difficult. Sections 17 and 18 of the mold are separated by wedges 15 of refractory material, for example, graphite, which protrude into the mold and form on the inner surface of the mold refractory ridges 16. These ridges should be relatively thin and sharp pointed and should have their lower side substantially perpendicular to the side wall of the mold to assist in the formation of a sharp corner in the finished block.

Into such a mold molten material is poured to a height sufficient to cover well the ridges 16 with molten material and to insure the absence of any objectionable excessive deposition of material at the ridges. Due to the refractory nature of the wedges and their wedge-shape and low heat capacity and conductivity, the deposition of solid material on the wedges proceeds at a lower rate than elsewhere in the mold due to a lower rate of abstraction of heat at that point. After the side walls of the shell 21 have attained the desired thickness a portion at least of molten material is removed from the shell by breaking a hole in the top portion and pouring out the molten material. A portion of the molten material may be permitted to remain in the shell and deposite on the bottom wall of the shell as previously described, or this step may be omitted and all of the molten material removed from the shell at the same time.

Figure 9:
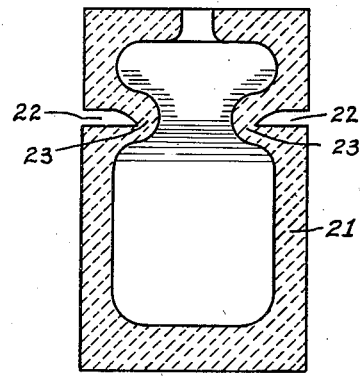
Figure 9 is a cross-section of a block in process of preparation according to the present invention as illustrated in Figure 8.

Referring to Figure 9, the shell thus formed consists of an upper and a lower section corresponding to the sections 17 and 18 of the mold 14, separated by a groove 22 which extends around the shell, and is caused by the presence of ridge 16 in the mold. At the groove the shell wall is preferably somewhat thinner than the remaining walls of the shell.

While the shell is still red hot, but after removal of the mold and wedges, a pinch bar may be inserted in the groove 22 to break off the upper portion of the shell 21, with a quick twist of the pinch bar, at the level of the groove 22, thus producing a hollow block as illustrated in Figure 3 in which five sides are closed and the sixth is open and of approximately the full dimensions of the face less the restriction caused by the re-entrant portions 7 which are the lower halves of re-entrance portion 23 of the shell.

For making a hollow block approximately 4" x 4" x 8", useful in the construction of furnaces and glass tanks, the mold may be made of cast iron or other suitable metal and may have walls approximately ½" thick, the wedges being 1" across and approximately $\tfrac{3}{16}$" thick. After casting, the mold may be allowed to stand for 30 seconds to two minutes, depending upon the conditions, after which a hole is broken through the top of the casting and the desired amount of molten material is poured out. The casting may be removed from the mold before or after pouring out the excess molten material and while still red hot should be separated as described above.

Figure 10:
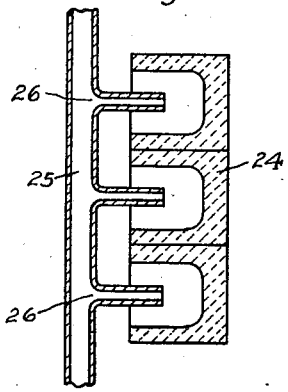
Figure 10 is a cross-section of a portion of a furnace wall illustrating a use for the new refractory article.

One method of utilizing these hollow blocks has been described in connection with Figure 4, another method is shown in Figure 10, in which a series of hollow open-backed blocks, preferably having one wall thicker than the remaining walls, is built into a wall in such position that the face 24 is exposed to erosion by molten glass, slag or the like. As a protection for the wall, an air-cooling system is provided in which a duct 25 terminates in a series of nozzles 26 which extend into the open cavities in the block at the rear of the space exposed to the action of the material in the furnace or the tank. Air supplied through these nozzles impinges on the back of the wall exposed to such action and serves to keep the wall cool thus making it possible to build up a layer of congealed slag on the face 24 which protects the block and thus prolongs the life of the refractory material. Similarly in a glass tank, such cooling may be used to prevent the penetration of molten glass through cracks between adjoining blocks.

The peculiar construction of the blocks made according to the present invention adapts them for use in the construction of suspended arches in furnaces, etc.

Figure 11:
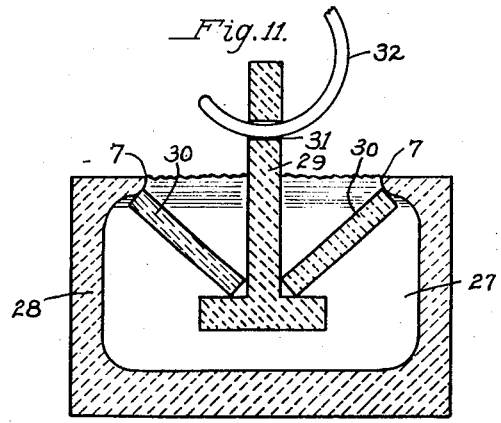
Figure 11 is a cross-sectional view illustrating another use for the new refractory article as a suspended arch block.

Referring to Figure 11 the open-backed hollow block made as above described has an interior cavity 27 surrounded by lateral walls, the inner faces 28 of which are somewhat rough, being composed of sharp, freely-formed crystalline faces as a result of the method of formation of the casting. At the upper side of these faces 28 there is a re-entrant ledge 7 formed as a result of the method of making the hollow block. This re-entrant ledge 7 extends practically completely around the mouth of the cavity of the casting. In preparing the casting for use in suspended arches a T-shaped piece 29 is inserted into the cavity 27 and pieces 30 are placed at each side of the T as illustrated. Pieces 29 and 30 may advantageously be made of refractory material or heat-resistant metal. After pieces 30 have been inserted so that their outer ends drop below the level of ledge 7, the T is raised, thus wedging the pieces 30 into firm contact with the inner ends of the casting and serving to support the assembly while suspended from the upper end of the T. If desired for additional stability, the T may be fixed in this upward position by insertion of suitable wedges, not shown, between it and the lower face of cavity 27. The T-shaped piece 29 is provided with an aperture 31 through which suitable suspension means, such as a steel hook 32, may be inserted. Suitable adjustment of the height of the suspended block may be made by the adjustment of the length of the upper arm of hook 32.

We claim:

1. A hollow fused cast refractory block for insertion in a furnace wall, said block being composed of crystalline refractory oxidic material and consisting of five solid walls surrounding a central cavity constituting a substantial portion of the overall volume of said block, said cavity communicating with the exterior of the block by means of an opening on the sixth side of said block and slightly smaller in area than the cross-sectional area of said cavity.

2. A hollow fused cast refractory block for insertion in a furnace wall, said block being composed of crystalline refractory oxidic material and having a central cavity of substantial volume therein, the cavity being open to one face of the block through an opening of slightly smaller diameter than that of the cavity and being separated from the other faces of the block by solid walls, one of which is materially thicker than the others.

3. A hollow fused cast block for insertion in a furnace wall, said block being composed of crystalline refractory oxidic material and consisting of side walls surrounding a central cavity, and another wall thicker than the foregoing walls separating the cavity from a face of the block on a side intended to be placed on the hot face of the furnace wall the cavity having re-entrant edges around an opening in one face of the block.

4. A fused cast refractory block for insertion in a furnace lining comprising a cavity of substantial volume within the block, the cavity connecting with one face of the block by an opening of smaller width than the cavity, and being separated from the other faces of the block by solid walls of crystalline refractory oxidic material, one of which walls is materially thicker than the others, the cavity being filled with granules of heat-insulating material united to one another and to the walls of the cavity.

RAYMOND C. BENNER.
JOHN CHARLES McMULLEN.